(12) United States Patent
Wheelock et al.

(10) Patent No.: US 11,435,498 B2
(45) Date of Patent: Sep. 6, 2022

(54) SUBSURFACE MODELS WITH UNCERTAINTY QUANTIFICATION

(71) Applicant: ExxonMobil Upstream Research Company, Spring, TX (US)

(72) Inventors: Brent D. Wheelock, Bloomsbury, NJ (US); Huseyin Denli, Basking Ridge, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 556 days.

(21) Appl. No.: 16/681,186

(22) Filed: Nov. 12, 2019

(65) Prior Publication Data
US 2020/0183046 A1 Jun. 11, 2020

Related U.S. Application Data

(60) Provisional application No. 62/777,868, filed on Dec. 11, 2018.

(51) Int. Cl.
*G06N 20/20* (2019.01)
*G01V 99/00* (2009.01)
(Continued)

(52) U.S. Cl.
CPC .............. *G01V 99/005* (2013.01); *G01V 1/50* (2013.01); *G06N 3/082* (2013.01); *G06N 20/10* (2019.01);
(Continued)

(58) Field of Classification Search
CPC .. G01V 99/005; G01V 1/50; G01V 2210/667; G01V 1/282; G01V 11/00;
(Continued)

(56) References Cited

U.S. PATENT DOCUMENTS

| 2010/0161300 | A1* | 6/2010 | Yeten | E21B 43/00 703/10 |
| 2019/0145239 | A1* | 5/2019 | Yu | G06F 30/20 175/40 |
| 2019/0147125 | A1* | 5/2019 | Yu | G06N 3/0445 703/10 |

FOREIGN PATENT DOCUMENTS

| FR | 3035723 A1 * | 11/2016 | ............. E21B 44/00 |
| KR | 101867475 B1 * | 6/2018 | ......... G06F 17/5009 |

(Continued)

OTHER PUBLICATIONS

M. Zaslavsky et al., "Large-scale Gauss-Newton inversion of transient controlled-source electromagnetic measurement data using the model reduction framework," Geophysics, vol. 78, No. 4 (Jul.-Aug. 2013), pp. E161-E171.

(Continued)

*Primary Examiner* — Kandasamy Thangavelu
(74) *Attorney, Agent, or Firm* — ExxonMobil Upstream Research Company—Law Department

(57) ABSTRACT

A method and apparatus for modeling a subsurface region, including: obtaining a training set of geologically plausible models for the subsurface region; training an autoencoder with the training set; extracting a decoder from the trained autoencoder, wherein the decoder comprises a geologic-model-generating function; using the decoder within a data-fitting objective function to replace output-space variables of the decoder with latent-space variables, wherein a dimensionality of the output-space variables is greater than a dimensionality of the latent-space variables; and performing an inversion by identifying one or more minima of the data-fitting objective function to generate a set of prospective latent-space models for the subsurface region; and using the decoder to convert each of the prospective latent-space models to a respective output-space model. A method and
(Continued)

apparatus for making one or more hydrocarbon management decisions based on the estimated uncertainty.

25 Claims, 9 Drawing Sheets

(51) Int. Cl.
*G06N 20/10* (2019.01)
*G01V 1/50* (2006.01)
*G06N 3/08* (2006.01)

(52) U.S. Cl.
CPC ....... *G06N 20/20* (2019.01); *G01V 2210/667* (2013.01)

(58) Field of Classification Search
CPC ......... G01V 2200/14; G01V 2210/665; G01V 1/306; G01V 1/40; G01V 3/083; G06N 3/082; G06N 20/10; G06N 20/20; G06N 3/042; G06N 3/08; G06N 7/00; G06N 7/06; E21B 21/08; E21B 44/00; E21B 47/00; E21B 49/003; G06F 17/5009; G06F 30/20; G06G 7/48
See application file for complete search history.

(56) References Cited

FOREIGN PATENT DOCUMENTS

WO   WO 2006115622 A1 * 11/2006 ............. G01V 3/083
WO        2019088543        5/2019

OTHER PUBLICATIONS

A. Ray et al., "Low frequency full waveform seismic inversion within a tree based Bayesian framework," Geophysical Journal International, 2018, vol. 212, pp. 522-542.
Y. Lin et al., A wavelet-based model compression method for three-dimensional electromagnetic data inversion.
E. Laloy, "Inversion using a new low-dimensional representation of complex binary geological media based on a deep neural network," Advances in Water Resources, No. 110, 2017, pp. 387-406.
S. Chan et al., "Parametrization and generation of geological models with generative adversarial networks," https://arxiv.org/abs/1904.03677, Apr. 9, 2019, pp. 1-26.
Y. Zhu et al., "Bayesian deep convolutional encoder-decoder networks for surrogate modeling and uncertainty quantification," Journal of Computational Physics, vol. 386, 2018, pp. 415-447.
A. Richardson, "Generative Adversarial Networks for Model Order Reduction in Seismic Full-Waveform Inversion," https://arxiv.org/pdf/1806.00828.pdf, 2018, pp. 1-10.
M. Liu et al., "Ensemble-bases seismic history matching with data re-parameterization using convolutional autoencoder," SEG International Exposition and 88th Annual Meeting, 2018, pp. 3156-3160.
S. Mandelli et al., "Seismic Data Interpolation Through Convolutional Autoencoder," SEG International Exposition and 88th Annual Meeting, 2018, pp. 4101-4105.

* cited by examiner

Training images $Z_2 > 0.5$

Training images $Z_2 < -0.5$

SUBSURFACE MODELS WITH UNCERTAINTY QUANTIFICATION

CROSS-REFERENCE TO RELATED APPLICATIONS

This application claims the benefit of U.S. Provisional Application No. 62/777,868, filed on Dec. 11, 2018, the disclosure of which is incorporated herein by reference.

FIELD

This disclosure relates generally to the field of geophysical prospecting and, more particularly, to prospecting for hydrocarbons and related data processing. Specifically, exemplary embodiments relate to methods and apparatus for generating subsurface models and/or quantifying uncertainties therein by using an autoencoder.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately model subsurface structures. For example, seismic data may be gathered and processed to generate subsurface models. Seismic prospecting is facilitated by acquiring raw seismic data during performance of a seismic survey. During a seismic survey, one or more seismic sources generate seismic energy (e.g., a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping of the subsurface region. The processed data is then examined (e.g., analysis of images from the mapping) with a goal of identifying geological structures that may contain hydrocarbons.

Geophysical data (e.g., acquired seismic data) and/or reservoir surveillance data may be analyzed to develop subsurface models. For example, one or more inversion procedures may be utilized to analyze the geophysical data and produce models of rock properties and/or fluid properties. Generally, inversion is a procedure that finds a parameter model, or collection of models, which, through simulation of some physical response to those parameters, can reproduce to a chosen degree of fidelity a set of measured data. Inversion may be performed, for example, on seismic data to derive a model of the distribution of elastic-wave velocities within the subsurface of the earth. For example, Full Wavefield Inversion (FWI) simulates the full three-dimensional behavior of seismic waves as they were induced in the field, and attempts to match the measured seismic response in its most raw form. FWI tends to be a very challenging computational problem because the amount of data to be simulated is large (comprising a full 3D seismic acquisition), and seismic simulated waves are sensitive to not only a large volume of the earth, but to relatively fine-scale variations in properties within that volume. Therefore, naive parameterization of a subsurface model (e.g., by uniform discretization) may require many volume elements (voxels) of uniform elastic velocities to match simulated data to the observed seismic data. Since the computational complexity of an inversion grows with the number of voxels, it would be of great benefit to derive compressed representations of the subsurface.

Subsurface models are often produced with a semi-automated or automated computer process. Once produced, the subsurface models are manually edited and interpreted (e.g., adding human experience and/or geologic knowledge). This staged process often produces models which, by the time geologic interpretation has been applied (by the manual interpretation), no longer satisfy the physics-based data constraints (from the inversion). This tends to result in a time-consuming endeavor, with no guarantee that the two competing approaches will converge to one agreed-upon model. Therefore, the process is expensive, slow, subjective, and possibly produces results which are not fully consistent with the observed data.

Many upstream decisions utilize subsurface models (e.g., of rock and fluid properties). Decisions can be enhanced, and the associated economic risks reduced, by understanding the accuracy and/or the uncertainty in the subsurface models. Exemplary decisions include: which properties to lease for exploration and how much to bid on them in auction; where to drill when exploring for new hydrocarbon resources; what will be the extractable volume, flow rate, and depletion mechanism of discovered resources; where will injector and producer wells be drilled; and what size facility with what capabilities will be built at the surface to process the produced fluids. In the event that a subsurface model has higher uncertainty than desired, final decisions may be postponed to allow for collection of additional, targeted data. Alternatively, a final decision may be hedged (e.g., economic hedging) to allow for business success under multiple subsurface scenarios. However, these alternatives may only be available when the uncertainty of the subsurface model has been quantified.

Attempts have been made to compress models within inversion of geophysical data in order to save computational resources and/or time. Heretofore, these attempts typically used bases and compression schemes that are linear and agnostic to geologic concepts. Linear bases may be limited in the level of complexity they can convey, and may tend to produce smooth, non-geologic models. Other attempts have been made using deep learning constructs trained on images of geologic structures to produce geologically-aware compression schemes. However, none of these have combined a compression scheme in a second-order deterministic inversion of geophysical data. Moreover, none of the previous attempts have identified multiple model scenarios which conform to the geologically-aware compression schemes through deterministic inversion, thereby being incapable of characterizing uncertainty in the model scenarios. Further, prior attempts have been limited by training libraries that lack fidelity to actual geologic processes and/or breadth in variety of geologic structures.

More efficient equipment and techniques to generate subsurface models and/or quantify the uncertainties therein would be beneficial.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be

DETAILED DESCRIPTION

Figure 1:
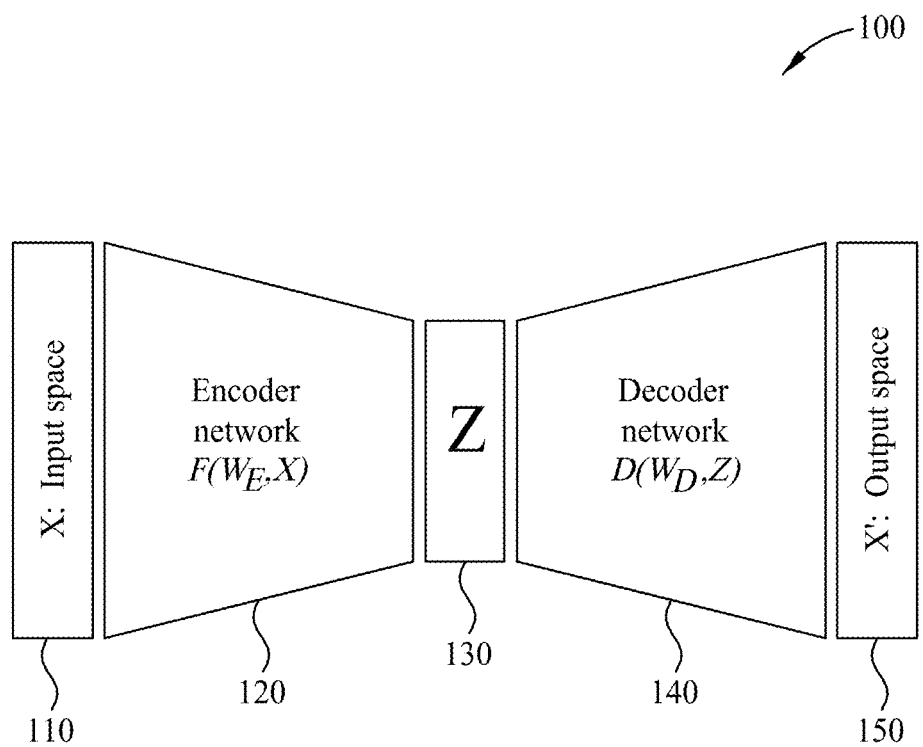
FIG. 1 illustrates an exemplary autoencoder.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation. The term "nominal" means as planned or designed in the absence of variables such as wind, waves, currents, or other unplanned phenomena. "Nominal" may be implied as commonly used in the fields of seismic prospecting and/or hydrocarbon management.

The term "seismic data" as used herein broadly means any data received and/or recorded as part of the seismic surveying process, including particle displacement, velocity and/or acceleration, continuum pressure and/or rotation, wave reflection, and/or refraction data; but "seismic data" also is intended to include any data or properties, including geophysical properties such as one or more of: elastic properties (e.g., P and/or S wave velocity, P-Impedance, S-Impedance, density, and the like); seismic stacks (e.g., seismic angle stacks); compressional velocity models; or the like, that the ordinarily skilled artisan at the time of this disclosure will recognize may be inferred or otherwise derived from such data received and/or recorded as part of the seismic surveying process. Thus, we may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic, gravity plus electromagnetic plus seismic data, etc. For example, joint-inversion utilizes multiple geophysical data types.

As used herein, "inversion" refers to a geophysical method which is used to estimate subsurface properties (such as velocity or density). Typically, inversion begins with a starting subsurface physical properties model. Synthetic seismic data may be generated (e.g., by solving a wave equation). The synthetic seismic data are compared with the field seismic data, and, using the differences between the two, the value of an objective function is calculated. To minimize the objective function, a modified subsurface model is generated which is used to simulate a new set of synthetic seismic data. This new set of synthetic seismic data is compared with the field data to recalculate the value of the objective function. An objective function optimization procedure is iterated by using the new updated model as the starting model for finding another search direction, which may then be used to perturb the model in order to better explain the observed data. The process continues until an updated model is found that satisfactorily explains the observed data. A global or local optimization method can be used to minimize the objective function and to update the subsurface model. Commonly used local objective function optimization methods include, but are not limited to, gradient search, conjugate gradients, quasi-Newton, Gauss-Newton, and Newton's method. Commonly used global methods include, but are not limited to, Monte Carlo or grid search. Inversion may also refer to joint inversion with multiple types of data used in conjunction. Specific inversion techniques may include Full Wavefield Inversion (seismic or electromagnetic), seismic tomography, seismic velocity model building, potential fields inversion, reservoir history matching, and any combination thereof.

The term "physical property model" or other similar models discussed herein refer to an array of numbers, typically a 3-D array, where each number, which may be called a model parameter, is a value of velocity, density, or another physical property in a cell, where a subsurface region has been conceptually divided into discrete cells for computational purposes. For example, a geologic model may be represented in volume elements (voxels), in a similar way that a photograph is represented by picture elements (pixels).

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.).

As used herein, "obtaining" data or models generally refers to any method or combination of methods of acquiring, collecting, or accessing data or models, including, for example, directly measuring or sensing a physical property, receiving transmitted data, selecting data from a group of physical sensors, identifying data in a data record, generating models from assemblages of data, generating data or models from computer simulations, retrieving data or models from one or more libraries, and any combination thereof.

Reservoir surveillance data may include, for example, well production rates (how much water, oil, or gas is extracted over time), well injection rates (how much water or $CO_2$ is injected over time), well pressure history, and time-lapse geophysical data.

Geophysical optimization may include a variety of methods geared to find an optimum model (and/or a series of models which orbit the optimum model) that is consistent with both observed/measured geophysical data and geologic experience, process, and/or observation.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is enhanced automation of procedures for generating subsurface models. Such automation may accelerate the generation of subsurface models, reduce subjective bias or error, and reduce the geoscience workforce's exposure to ergonomic health risks (e.g., exposure to repetitive tasks and injuries therefrom). Another potential advantage includes converting geologic rules, concepts, patterns, and experience into finite computer code. Another potential advantage includes providing a unified mathematical framework by which both physics-based data constraints and geologic concepts are satisfied by a single procedure. Another potential advantage includes improvement in speed and accuracy of the already automated portion of the process. For example, by speeding up the search for valid models (e.g., during FWI), embodiments may enable the discovery of multiple data-consistent and geologically reasonable models. Another potential advantage includes providing uncertainty quantification for the subsurface models. Embodiments of the present disclosure can thereby be useful in the discovery and/or extraction of hydrocarbons from subsurface formations. For example, geophysics applications may include surface recordings of seismic, gravity, and electromagnetics, without any well data, for hydrocarbon exploration.

Reservoir surveillance applications may include efforts to improve or maximize extraction after a reservoir starts production.

In some embodiments, an autoencoder may be utilized. FIG. 1 illustrates an exemplary autoencoder 100. As illustrated, autoencoder 100 is generally a deep learning (or "machine learning") construct with an hour-glass shaped convolutional neural network ("CNN").

Autoencoder 100 may be used to characterize a low-dimensional form of patterns found in a library of geologic examples. For example, input space 110 may contain a library of geologic examples. The input space 110 may generally contain the training set for the autoencoder 100. During training, the encoder network 120 may characterize input space 110 in terms of a low-dimensional encoded space 130. Moreover, during training, a decoder network 140 may be found to characterize encoded space 130 in terms of an output space 150. Decoder network 140 may convert low-dimensional encoded space 130 into a full-scale (high-dimensional) model in output space 150. As such, output space 150 may conform to the geologic behavior exhibited in the training set contained in input space 110. Models in output space 150, generated by decoder network 140 of autoencoder 100, may be used as input to a deterministic inversion to find a geologically reasonable model, or collection of models, which are each consistent with the geophysical, petrophysical, and other observed data represented in the training set.

In some embodiments, by transforming low-dimensional parameters to high-dimensional parameters, the model-generative ability of the decoder network 140 may be utilized with an optimization (e.g., inversion of geophysical data). With the benefit of the trained decoder network 140, the optimization may be able to search a low-dimensional, geology-conforming space for models which are consistent with quantifiable data (e.g., geophysical, seismic, electromagnetic, gravimetric, well-logs, core samples, etc.).

In some embodiments, the optimization may be a joint inversion. For example, a training set for joint inversion may include models which are described by multiple voxelized rock parameters: resistivity, density, compressional- or shear-wave velocities, porosity, permeability, lithology type, etc. Covariance and/or interactions between these different categories of rock description may be ingrained in the training set examples by nature of the simulations or real-world observations which created these examples. Then the decoder may capture information about the different parameter interactions and distill the interactions into a simpler "latent space" description (e.g., encoded space 130). As the joint inversion proceeds, the expected rock parameter covariance (e.g., between resistivity and velocity) may be reproduced by the decoder. Consequently, the inversion models may conform to realistic rock-parameter covariance while simultaneously fitting the various observed data (e.g., electromagnetic and seismic records).

In some embodiments, autoencoder 100 may extract spatial patterns common among training models. In some embodiments, the autoencoder 100 may approximate the common spatial patterns, for example with a non-linear function. In some embodiments, the encoder network 120 may utilize such approximations to develop the latent parameters of encoded space 130. In some embodiments, the latent parameters may be much fewer in number than the parameters of input space 110. For example, the original training models may be represented as a large number of voxelized physical properties. In some embodiments, during training, the autoencoder 100 produces a decoder network 140. In some embodiments, the decoder network 140 may be a non-linear function, embodied by a CNN, which maps the latent parameters back to the full-dimensionality of the original training models.

In some embodiments, the autoencoder may be trained. For example, a CNN's mapping behavior may be determined by a large number of weights. Unless otherwise specified, as used herein, "weights" generally refer to multiplicative variables (commonly known as weights) and/or additive variables (commonly known as biases). The autoencoder's CNN may learn a preferred and/or improved setting for the large number of weights through training. In some embodiments, the decoder network is based on the CNN-based mapping function.

In some embodiments, due to the compression of the operative model space from high-dimensions to low-dimensions, the optimization and uncertainty quantification problems may be more computationally tractable than without such compression. For example, a standard geologic model may have an arbitrary number of voxels. An autoencoder may produce a geologic model with a small number of dominant encoded dimensions (i.e., latent parameters of the encoded space). The number of latent parameters may scale with the number of input (voxelized) dimensions. For example, if the input has $10^6$ dimensions, the latent dimensions may number around $10^3$, resulting in 1000-times compression. In some embodiments, the latent dimension should scale between 100 and 1000. In some embodiments, the latent dimension may be at least 100 times smaller than the voxel dimension. By describing geologic features with a small number of dominant encoded dimensions, the uncertainty quantification process may be defined as a new optimization problem that is greatly reduced in computational scale. In some embodiments, quantifying uncertainty can include a search for a selection of models which are equally consistent with available data and far apart in geologic-feature (or latent-parameter) space.

In some embodiments, the process for generating subsurface models may be automated. As would be understood by one of ordinary skill in the art with the benefit of this disclosure, producing a subsurface model often involves a blend of automated computation and manual interpretation. The automated computation typically includes numerical simulation of various physical phenomena (e.g., elastic waves) and/or inversions to convert observed phenomena (e.g., a recorded energy or potential field, either at the earth's surface or in a borehole) into an estimate of the rock and/or fluid properties which gave rise to the observed phenomena. Often, only a subset of subsurface properties is recovered during the automated computation. Often, those properties that are recovered may not be recovered with sufficient certainty or resolution for robust decision making. The manual interpretation typically augments the incomplete property estimates from the automated computation. For example, one or more experts may analyze the results of the automated computation in light of general experience and/or local knowledge to generate a geologic rationale for the subsurface region's features. Identification of the paleo-processes may reduce the number of possible subsurface configurations. Furthermore, paleo-processes may dictate geologic rules and patterns. Manual interpretation utilizes mental integration of large and diverse sources of data. Often, the manual interpretation can be very time-consuming. Being human-driven, results from manual interpretation vary with the unique personality and memory of those who produced the results. In some embodiments, results may be obtained more quickly and may be more accurate and repeatable than with manual interpretation.

In some embodiments, the automated computations may have improved speed and/or accuracy compared to current procedures. Inversion of physical equations for subsurface rock and fluid properties may be computer-intensive and time-consuming, and may sometimes fail to converge to a geologically-accurate model. The number of parameters used to model subsurface regions sufficiently to simulate geophysical data tends to be too large to allow for an exhaustive search of all possible parameter combinations to identify those combinations which are consistent with field measurements. Commonly, the number of unknown parameters is far greater than the number of measured geophysical constraints. Inversion may result in a wide range of models which satisfy all of the constraints, some of which may not conform to known geologic concepts. Embodiments disclosed herein may transform ("encode") subsurface parameters (e.g., seismic velocity, porosity, permeability) to a reduced set. Use of the reduced set may reduce the computational costs of searching for models which are data-consistent. Likewise, use of the reduced set may automatically constrain the search to models which are geologically reasonable.

In some embodiments, uncertainty quantification for the subsurface models may be provided. Embodiments may enable the discovery of multiple data-consistent and geologically reasonable models. As would be understood by one of ordinary skill in the art with the benefit of this disclosure, uncertainty quantification may be better stated when prospective models are broadly different geologically. The search for models which are data-consistent may result in an ensemble of models that span a wide range of geologic uncertainty.

In some embodiments, the deep learning involves modifying a set of parameters governing the behavior of a system of equations to produce a desired result. Given a set of inputs, this system of equations may produce a deterministic output, which changes depending upon the internal adjustable parameters. The preferred settings for these internal parameters are generally defined by those which, when known inputs are given, produce a close approximation to the expected outputs. These known inputs and corresponding outputs are called a training set. The mathematical process of finding the preferred values for the internal parameters utilizes a training set of many examples. Training then proceeds by taking an example input from the training set, using the system of equations and current internal parameters to create an output, comparing that output to the expected output for that training example, and then modifying the internal parameters through a prediction for improving performance In some embodiments, the deep learning may be supervised. For example, for each input (e.g., image) in the training set, the desired output (e.g., labeled object) may be produced by a human. In some embodiments, the deep learning may be unsupervised. For example, the expected output may be an overall strategy, rather than a human-derived expected output. In some embodiments, autoencoder 100 may create two mappings (e.g., encoder network 120 and decoder network 140) which may be applied in sequence to recover the original input space 110 (e.g., unsupervised learning, where the input and output images (or voxelized models) generally match).

In some embodiments, the autoencoder 100 may utilize one or more CNNs to perform dimensionality reduction of voxelized models. The encoder network 120 may reduce the number of input values (voxel properties) down to a much smaller number of latent parameters of the encoded space 130. The decoder network 140 may expand these latent parameters back to the full dimensionality of the original input space 110. In some embodiments, encoder network 120 may transform a voxel-based description of the subsurface into one based on geologic features (e.g., encoded space 130). In some embodiments, encoded space 130 (i.e., a latent space) may then be probed in a physics-based inversion. For example, the decoder network 140 may convert potential latent-space models proposed by inversion to the voxelized output space 150, which is then used by a physics simulator to create synthetic data to compare with the observed data.

It should be understood that output space 150 generally describes, in digital format, the natural world, for example as could be described in a physics simulator. Alternatively, the latent encoded space 130 generally describes abstract geologic concepts, for which there are no governing physics.

The only link between the two is the learned decoder network 140. As such, the latent encoded space 130, containing latent parameter vector Z, may be used by an optimization engine to search for a preferred model in low-dimensions. However, voxelized output space 150 may be used by an optimization engine for an assessment of data misfit, since that may involve a physics simulator.

Figure 2B:
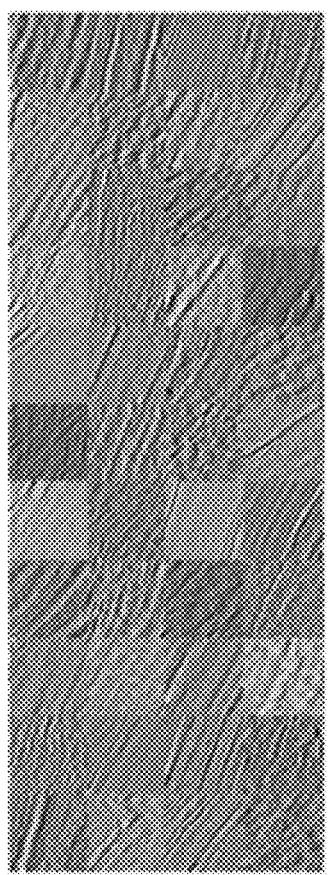
FIGS. 2A and 2B illustrate exemplary sets of training images to be used with the autoencoder of FIG. 1.
Figure 2A:
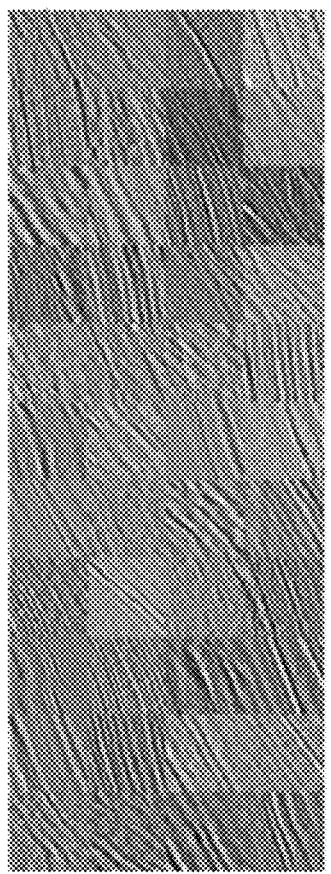

FIGS. 2A and 2B illustrate sets of training images (e.g., image patches from an unlabeled seismic dataset). Each of the training images in each of FIGS. 2A and 2B has been converted to a latent parameter description using the encoder function of a trained autoencoder. The training images have been divided into two groups based on the value of latent parameter $Z_2$, which encodes the geologic concept of layer dip. The group of training images in FIG. 2A has latent parameter $Z_2$ values less than −0.5, while the group of training images in FIG. 2B has latent parameter $Z_2$ values greater than 0.5. Note how the dip of the layers observed in the seismic response points downward to the left in the images in FIG. 2A, while the dip of the layers points downward to the right in the images in FIG. 2B. Latent parameters, or combinations thereof, that correspond to a geologic meaning may be referred to as geologic axes.

Figure 3A:
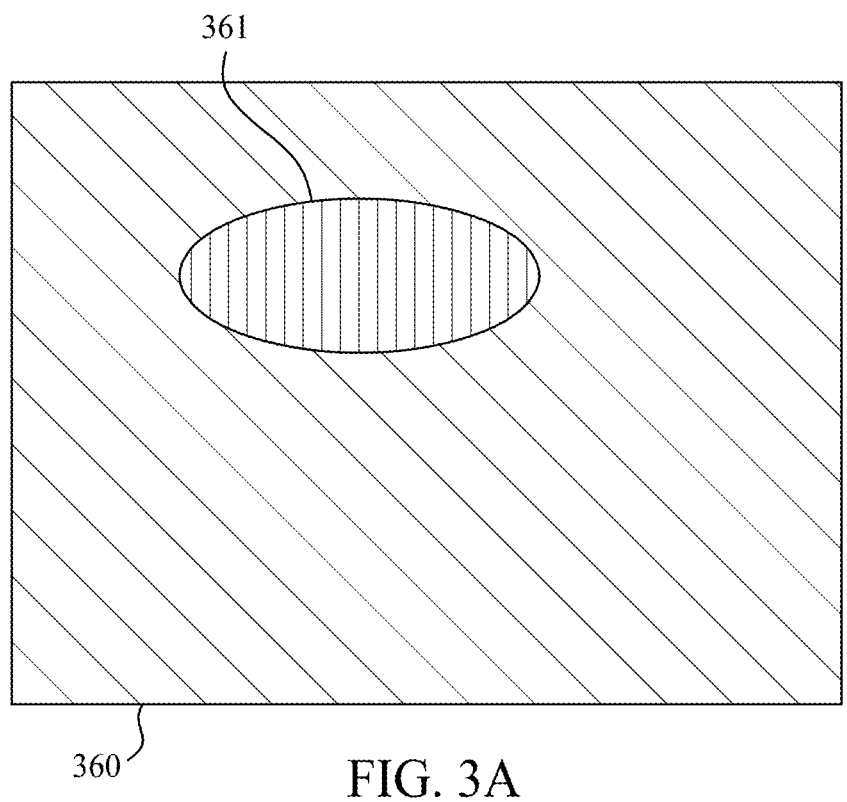
FIG. 3A illustrates space of possible models for a given subsurface region and a subspace therein that represents only those elements that are each geologically plausible for the subsurface region.

In some embodiments, a training set may include only elements that are each geologically plausible. The training set may include only a subspace of all possible models. For example, FIG. 3A illustrates a space 360 of all possible models for a given subsurface region. Subspace 361 within space 360 represents only those elements that are each geologically plausible for the subsurface region. For example, the geologically plausible elements generally follow the same rules (e.g., patterns of layering: sequence, continuity, faulting; and ductile buoyancy flow: salt bodies) as seen in the training set. Rather than representing the followed-rules (which may be quite numerous) as individual constraints, the training set may be a spanning representation of how plausible geology works and/or how rocks are actually arranged. In some embodiments, the training set may be specific to a certain region of the earth. In other embodiments, the training set may generally include plausible geology for any region of the full earth. The training set may exemplify in at least one example each of the pertinent geologic rules. Thus, plausibility may be defined by the statistics of the training set.

In some embodiments, training set elements may be created from synthetic geologic models. In some embodiments, a computer simulation may be run to create some or all of the elements in the training set. For example, the training set examples may be generated with process stratigraphy (PS). Generally, PS is a method for simulating geologic patterns. PS may include a numerical simulation of the physics governing how grains of rock are transported, eroded, and/or deposited in a fluid (e.g., a simulation of sediment-laden water flowing from the outlet of a river, into an ocean, and out to the down-dip extent of a delta lobe). In some embodiments, a synthetic earth generator (e.g., a PS simulator) may produce a library of training models. Additional examples of computer simulations of geologic patterns may include salt body plastic flow simulations, geomechanical simulations, and/or basin and petroleum system simulations. Each training model may thus represent an instance of plausible geologic behavior in the subsurface region of interest.

In some embodiments, training set elements may be created from heuristic methods for producing geologic models (e.g., earth modeling with functional forms, interpreted seismic sections, and/or digitized observations of rock outcrops).

The training set elements may represent geologic parameters (e.g., three-dimensional stacking patterns of rock layers) on a scale similar to that of the desired geologic model. For example, rock layers within these models may be described by such parameters as facies type (e.g., sand, shale, or salt) and/or grain-size distributions. By merit of the rules and input parameters governing the chosen earth-model generator, the rock layers of the training set elements may adhere to depositional, erosional, tectonic physics, and/or the constraints of a specific basin (e.g., observed base morphology and historical sediment flux).

Figure 3B:
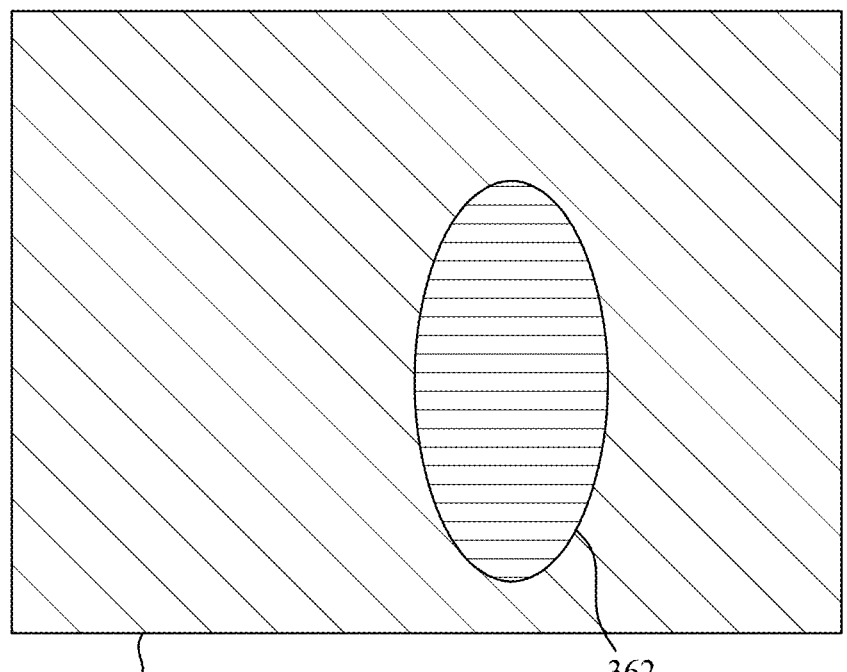
FIG. 3B illustrates a subspace (within the space of FIG. 3A) that represents models that may result from a deterministic inversion method.

In some embodiments, a deterministic inversion method may be utilized to find a model which is consistent with the geophysical or petrophysical (e.g., seismic or well-log) data observations. For example, as illustrated in FIG. 3B, the subspace 362 within space 360 represents those models that may result from a deterministic inversion method. Such models are thus consistent with observed data (e.g., geophysical, petrophysical, etc.).

Figure 3C:
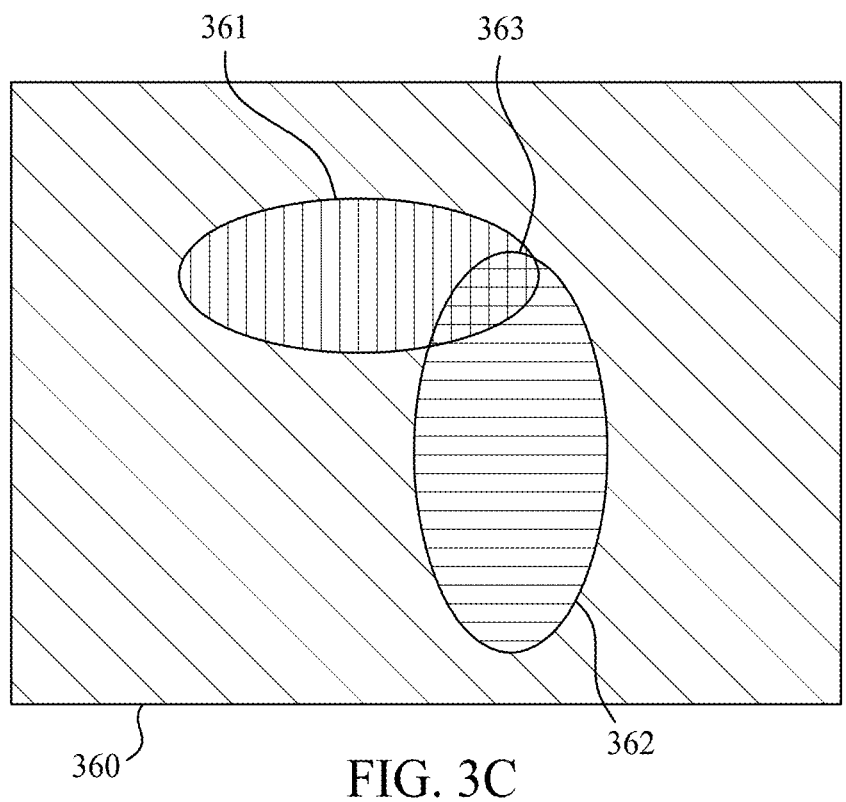
FIG. 3C illustrates a subspace (within the space of FIG. 3A) which is the intersection of the subspace of FIG. 3A with the subspace of FIG. 3B.

In some embodiments, a deterministic inversion method may be utilized to find a model within a subspace of geologic plausibility which is consistent with the geophysical or petrophysical (e.g., seismic or well-log) observations. FIG. 3C illustrates subspace 363 which is the intersection of subspace 361 with subspace 362. Thus the models contained in subspace 363 may be both geologically plausible and consistent with geophysical, petrophysical, and other observed data.

Figure 3D:
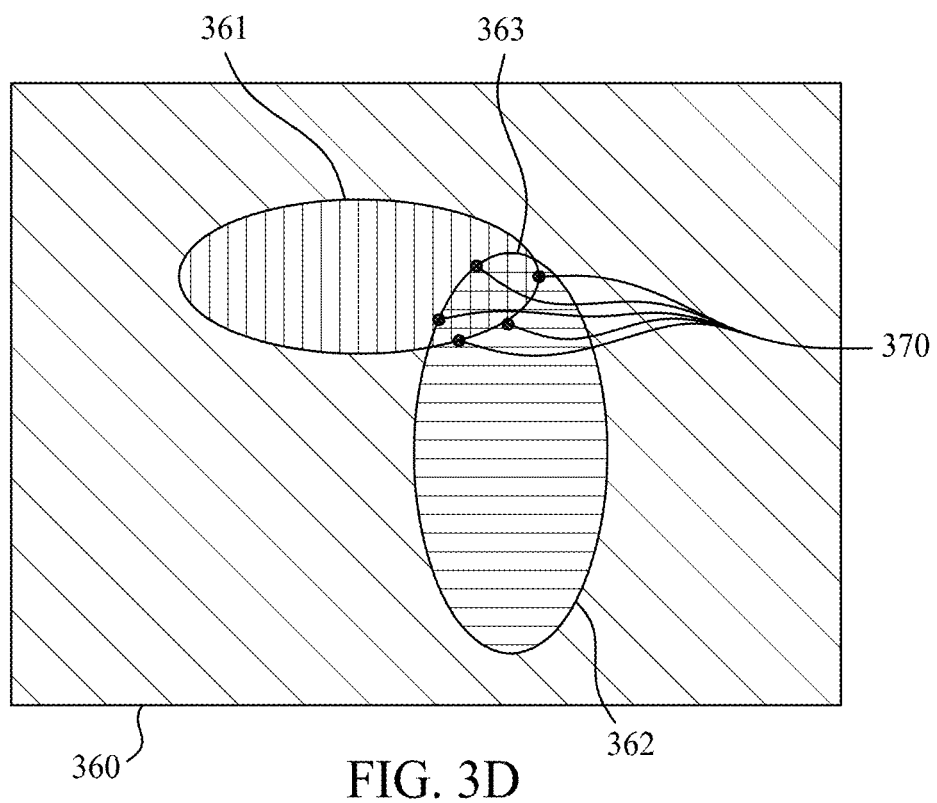
FIG. 3D illustrates different models lying on the boundary of the subspace of FIG. 3C.
Figure 4A:
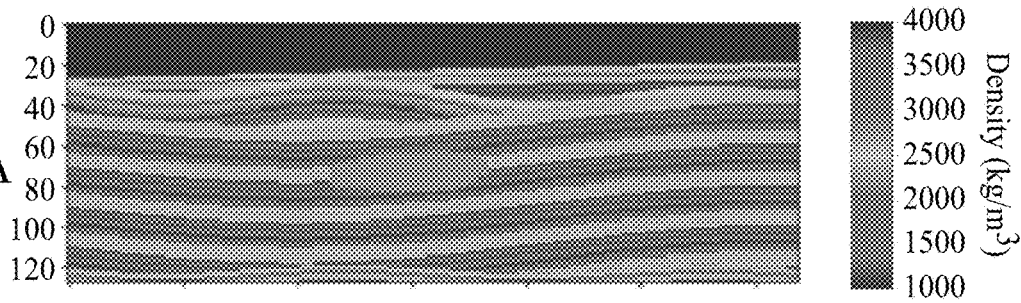
FIGS. 4A-4E illustrate images of different geologic structures, as might be represented by the models of FIG. 3D.
Figure 4B:
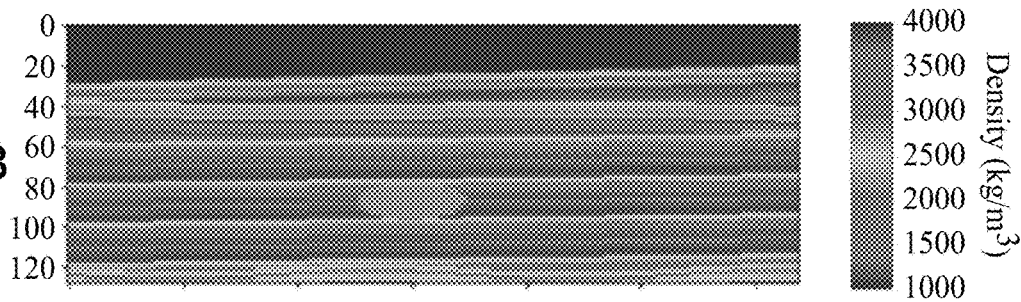
Figure 4C:
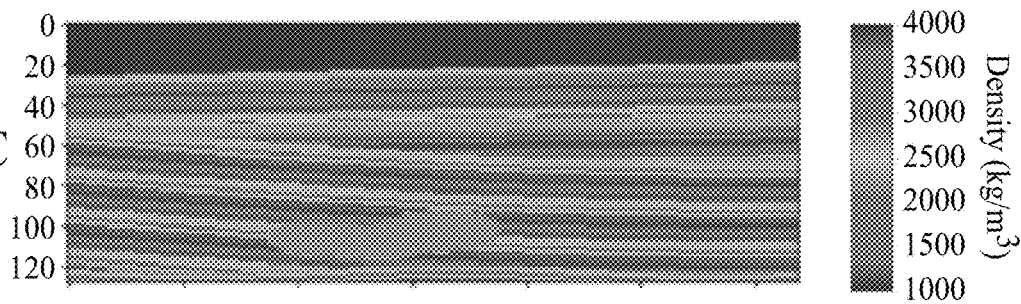
Figure 4D:
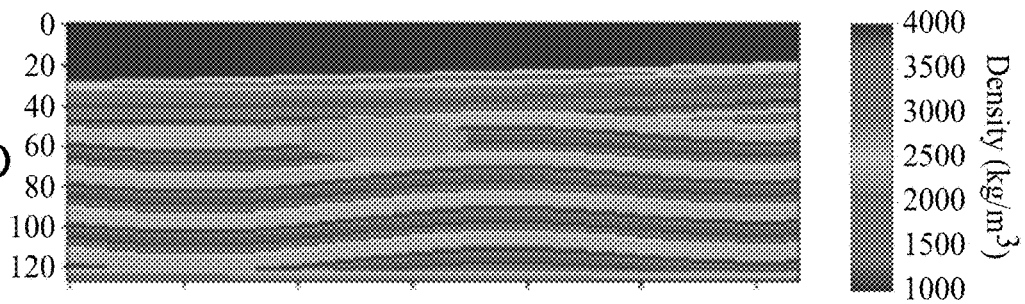
Figure 4E:
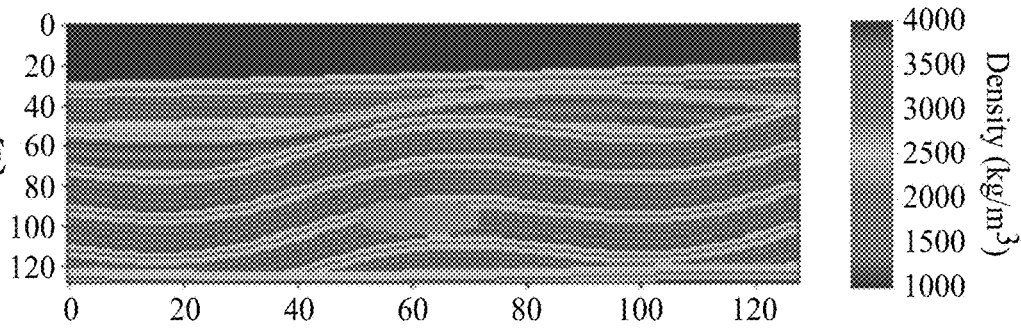

Often, there will be multiple models in the subspace 363. The multiple models may represent a range of models within the geologically-plausible subspace which reproduce physical responses within acceptable proximity to those observed (e.g., seismic, gravity, and/or electromagnetic data). It should be appreciated that the range of variations of the multiple models may be most broadly expressed on the boundary of subspace 363. For example, FIG. 3D illustrates five different models 370, each lying on the boundary of subspace 363. The five different models 370 thereby represent a broad range of models within the geologically-plausible subspace which reproduce physical responses within acceptable proximity to those observed. In some embodiments, uncertainty quantification may improve when prospective models are more broadly differentiated. As an example, FIGS. 4A-4E are images of five different geologic structures. The gravity signatures (at the earth's surface) of the five geologic structures are similar, such that a single inversion could be satisfied by any of these five models. The five different models 370 lying on the boundary of subspace 363 of FIG. 3D may represent a range of variations in geologic structure similar to the range of variations in FIGS. 4A-4E.

In some embodiments, a training set may be selected to include only elements that are each geologically plausible, such as those in subspace 361. It can be seen that subspace 361 represents a small subspace within the space 360 of all possible models for a given subsurface region. Autoencoder 100 may be trained with such a training set. The subspace 361 of geologically plausible models can be described by differentiable, or piece-wise differentiable, functions by way of the encoder network 120 and/or decoder network 140. The encoder network 120 may take any model in input space 110 and convert this model to a latent encoded space 130. For example, geologic plausibility may be measured in latent encoded space 130 by some metric, (e.g., by distance from some paragon or mean latent-space model, Z). The decoder network 140 may take any geologically plausible description in latent encoded space 130 and convert this description to an output space 150, which conforms to a description usable by a physics simulator (e.g., voxelized parameters). After training, latent encoded space 130, output space 150, and decoder network 140 may then be utilized with a deterministic inversion method. The inversion may perform a parameter search in latent space. The inversion may use the decoder network (and its functional derivatives) to convert proposed models to the output space. The physical consistency of the converted proposed models may be measured with observed and/or synthetic data. For example, the synthetic data may be created by physics simulation using the output space. The inversion may produce models which reproduce physical responses that lie within acceptable proximity to those observed (e.g., subspace 362). Since the training set included only subspace 361, the inversion may thus produce geologically-plausible models within subspace 361 which are consistent with the observed data (e.g., subspace 362). In other words, such inversion may produce those models of subspace 363.

An exemplary embodiment may include the following. The subsurface region to be analyzed may be represented as a volumetric earth description with N parameters, having N/2 voxels. Each voxel may be defined by a porosity value $\phi_i$ and a permeability value $\kappa_i$, stored in voxel vector X. Each training model may be selected from a library of such volumetric earth descriptions (any of which may contain anisotropic parameters). The autoencoder may solve for a compressed and/or approximated description of the full set of such voxelized training models. The encoded description may use only K parameter coefficients stored in a latent parameter vector Z, where K<<N. Training the autoencoder may produce a decoder network $D(W_D,Z)$. The decoder network may be a non-linear, vector-valued function which is configured to transform any latent parameter vector Z to an approximation of its corresponding voxel vector X, wherein:

$$D(W_D,Z): G \subset R^K \mapsto R^N \quad (1)$$

and thus:

$$X \approx X' = D(W_D,Z). \quad (2)$$

In some embodiments, the autoencoder may be symmetrical. Training the autoencoder may produce an encoder network $F(W_E,Z)$. The encoder network may be a complementary function to the decoder network, wherein:

$$F(W_E,X): H \subset R^N \mapsto R^K \quad (3)$$

where:

$$Z = F(W_E,X). \quad (4)$$

The decoder network $D(W_D,Z)$ may generally describe the geologic phenomena embodied by the set of training models. In some embodiments, the decoder network $D(W_D,Z)$ may replicate the potentially spatially varying and anisotropic covariance, and/or higher-order moments, expected amongst voxels in a geologically plausible subsurface region. For example, geologically plausible subsurface regions may exhibit high levels of spatial co-dependence, which change by location in the model. The decoder network $D(W_D,Z)$ may be driven by a relatively small number of independent parameters. The non-linear function of the decoder network $D(W_D,Z)$ may enable the latent parameters of Z to describe features that occur at length scales not uniquely determined by observed data, even though the number of latent parameters, K, may be fewer than the number, N, of parameters in a voxelized earth model (e.g., voxels used in traditional seismic inversion). In some embodiments, the decoder network $D(W_D,Z)$ may use geologic information from the training models, which may be much finer in resolution than what may be typically achieved by seismic inversion.

Figure 5:
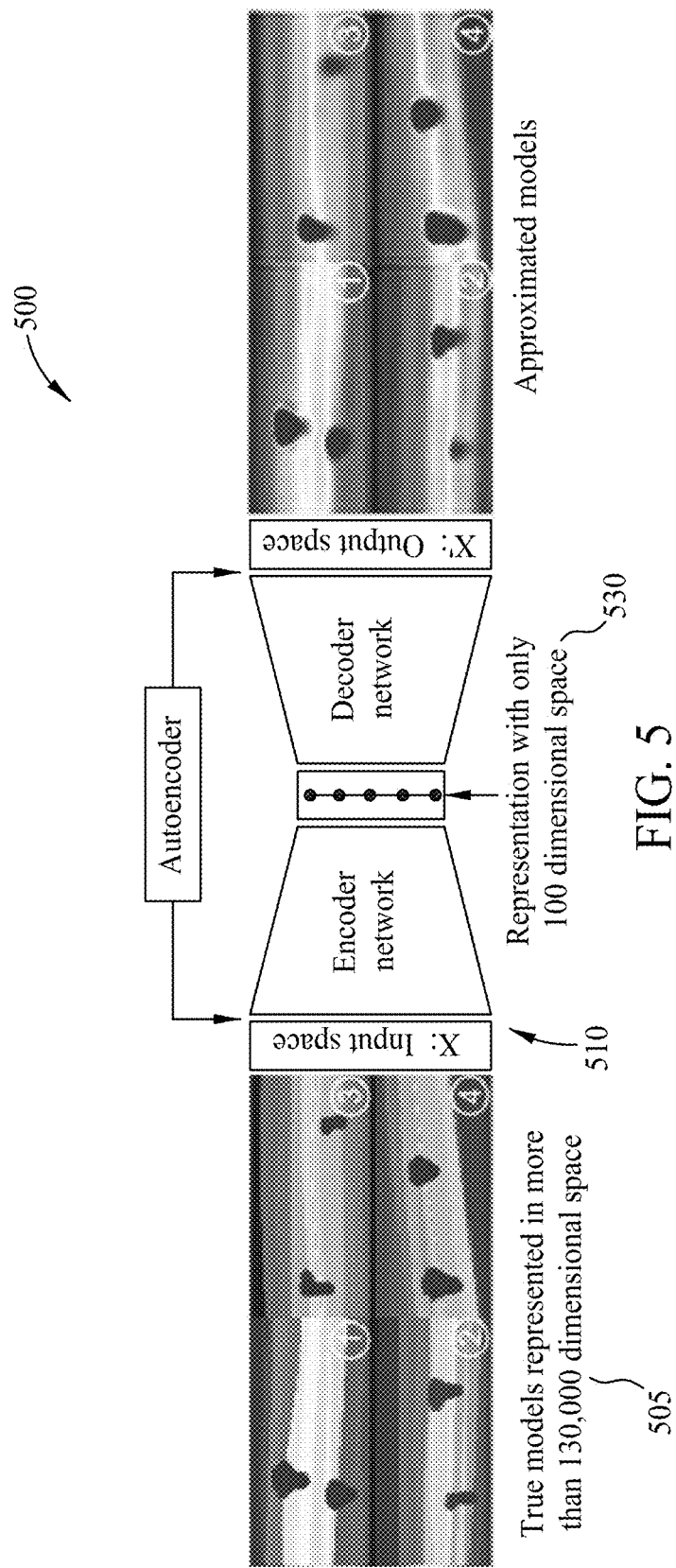
FIG. 5 illustrates another exemplary autoencoder.

FIG. 5 illustrates an exemplary embodiment of an autoencoder 500. The autoencoder 500 may be trained with a library 505 of geologic models (e.g., models of sediments surrounding salt diapirs). For example, the input space 510, based on training library 505, may include models having $N=13 \times 10^4$ parameter dimensions. The encoded space 530 may have K=100 parameter dimensions as a result of a discretization. For example, the autoencoder 500 may be used to compress the variability in a training set into a set of geologic features. The exemplary embodiment may include a FWI objective function formulated in the lower-dimensional encoded space 530. For example, an inversion may be performed on the latent parameter space.

In the exemplary embodiment, a data vector $d \in R^M$ may contain observed data (e.g., seismic observations, well-logs, etc.). A forward operator may produce a synthetic data vector $f[X]$ of the same size as the data vector. The $L_2$-norm of misfit may be minimized:

$$\min_X \|W(f[X]-d)\|_2 \quad (5)$$

where W is a data-weighting matrix, often referred to as the "whitening transformation." If the data residuals are expected to be Gaussian-distributed with covariance matrix $C_d$, then:

$$W^T W = C_d^{-1}. \quad (6)$$

With the model re-mapping afforded by the decoder $D(W_D,Z)$, Equation (5) may be approximated as:

$$\min_Z \|W(f[D(W_D,Z)]-d)\|_2. \quad (7)$$

Also, with the model re-mapping afforded by the decoder $D(W_D,Z)$, Equation (7) may be solved with algorithms like Gauss-Newton. For example, successive solutions of the linearized system for $Z_{k+1}$ may be given as:

$$[(WJ)^T(WJ)](Z_{k+1}-Z_k) = (WJ)^T W(d - f[D(W_D,Z)]) \quad (8)$$

where J is the Jacobian matrix of the vector-valued function $f$ with respect to the latent parameters in $Z_k$, the previous iteration's solution vector. In some embodiments, the matrix of derivatives of the decoder function to complete the Jacobian matrix may be calculated. With indices referring to vector elements rather than Gauss-Newton iteration, the chain rule may be applied to write the elements of J in terms of the forward-operator and decoder derivatives:

$$J_{ij} = \sum_{l=1}^{N} \frac{\partial f_i}{\partial X_l} \frac{\partial D_l}{\partial Z_j}. \quad (9)$$

In some embodiments, regularization may be added to the objective function of equation (7). For example, regularization may be used to stabilize the numerical solution of the under-determined inverse problem. Regularization may assist in selecting one or more particular models (e.g., models in subspace 363) out of a wide continuum of models (e.g., models in subspace 362). As previously discussed, subspace 362 may represent a set of models, each of which satisfies the data misfit norm in equation (7), at least to a level X*² that is commensurate with the estimated noise in the data vector d. Equation (7) may then be replaced with $$\min_{Z}\{\|W(f[D(W_D, Z)] - d)\|_2^2 - \chi_*^2\} + \lambda^2 \|R(Z - \bar{Z})\|_2^2 \quad (10)$$

where λ is a Lagrange parameter, which may be either fixed or adaptively modified, R represents some linear regularization operation, and $\bar{Z}$ represents a selected latent-space paragon. In some embodiments, selected latent-space paragon $\bar{Z}$ is a pattern having desired characteristics. For example, selecting a final model may include comparing potential models of latent-space paragon $\bar{Z}$ and selecting that with the closest resemblance. In some embodiments, deviations from the mean latent parameter values in a training set may be penalized, R may be an identity matrix, and $\bar{Z}$ may be the mean latent parameter vector. Such a regularization term may be related back to the maximum a posteriori estimate of the latent parameter vector through Bayes' theorem, given the prior probability density function for Z is a multivariate Gaussian with covariance matrix $C_Z = (R^T R)^{-1}$, and mean, $\bar{Z}$. In some embodiments, a variational autoencoder may be used during training to help ensure that the prior probability density function of the latent parameter vector is Gaussian, is isotropic, and has a zero mean (i.e., $C_Z$ is an identity matrix, and $\bar{Z}$=0).

In some embodiments, uncertainty of the various models may be quantified. For example, uncertainty may be estimated by finding multiple data-consistent models that are derived from autoencoders trained with different training sets. Multiple autoencoders may be trained, each on a different library of models. Each library of models may be populated by samples from a different geologic setting. The decoder network from each of the multiple different autoencoders may then be inserted into equation (7) or equation (10), and an inversion may be performed with each. The inversions, as before, find data-consistent models. Taken together, the process finds multiple data-consistent models that are derived from different training set information. The multiple models may indicate the range of subsurface possibilities that are consistent with the data (assuming a reasonable misfit is achieved by each, and/or equally likely geologic settings were used to produce the training libraries). This may provide a way of incorporating competing theories for background geologic setting into inversion and discrete scenario generation.

As another example, uncertainty of the various models may be estimated with a decoder based on a single training library. For example, uncertainty may be quantified by operating on the features defined by the latent parameters. As illustrated in FIG. 3D, subspace 363 contains only those models which are both data-consistent and geologically plausible. A width of that region along one or more key axes provides an estimate of uncertainty. For example, the key axes may be one latent parameter, or a linear combination of multiple latent parameters of the encoded space of the autoencoder. Variation along the feature dimensions (i.e., latent parameters) may enable modulation of the geologic patterns of interest. The number of key axes may be far fewer than the number of original voxel parameter dimensions. In some embodiments, uncertainty estimation may proceed along only one or only a few dominant dimensions. The width of subspace 363 along a particular dimension may be determined by regularization (e.g., seeking a minimum and maximum for that particular latent parameter in two separate inversions). The inversion may be constrained to either minimize or maximize the value of one or more latent parameters while still specifying that the data be reproduced to a desired level.

Figure 6:
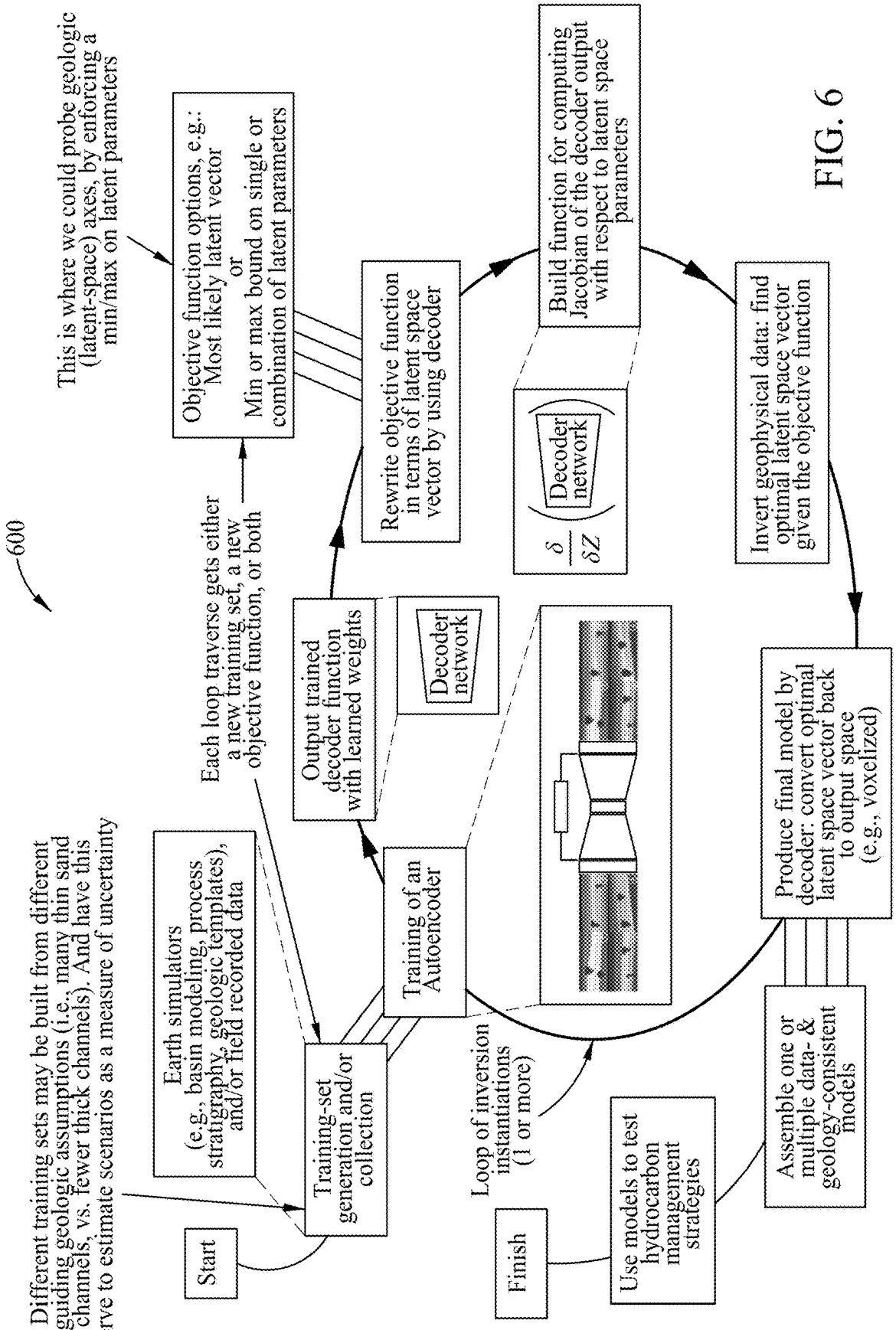
FIG. 6 illustrates an exemplary method disclosed herein.

FIG. 6 illustrates an exemplary method 600. As illustrated, in some embodiments, a model of a subsurface region and uncertainty in that model may be generated. For example, a set of training examples may be obtained and/or assembled. The training examples may exhibit plausible geologic behavior relevant to the subsurface region of interest. The training examples may comprise actual field-recorded data, or interpretations thereof in geologic model form, and/or models resulting from computer simulations of earth processes. The training set may comprise multiple rock parameter descriptions of the subsurface (e.g., porosity, permeability, density, resistivity, elastic wave velocities, etc.). The set of training examples may be used to train an autoencoder. In some embodiments, the decoder (i.e., the generative function) of the autoencoder may be extracted and inserted into an objective function of a geophysical or hydrocarbon reservoir surveillance inversion. In some embodiments, the geophysical inversion may seek a subsurface model which is consistent with one or more geophysical data types (e.g., seismic, electromagnetic, gravity, petrophysical well-log data, etc.). For example, the reservoir surveillance inversion may seek a subsurface model which is consistent with one or more reservoir surveillance data types (e.g., pressure, temperature, extracted/injected volume rates). In some embodiments, the decoder may replace high-dimensional variables of an output space which describe the subsurface with lower-dimensional variables in a latent space. In some embodiments, a geophysical inversion may minimize, or at least reduce, the objective function to find a preferred low-dimensional description of the subsurface. For example, during minimization and/or reduction of the objective function, a Jacobian of the decoder may be calculated with respect to the latent-space parameters, as means to determine a data-misfit-reducing search direction in latent space. As another example, products of that Jacobian with latent-space and output-space vectors may be used, circumventing storage of a Jacobian calculation in computer memory. In some embodiments, a preferred low-dimensional description of the subsurface may be converted into high-dimensions using the decoder. In some embodiments, uncertainty in the subsurface model is assessed by running multiple inversions with different decoders extracted from autoencoders trained with different training sets (thereby incorporating different geologic assumptions, processes, or environments). In some embodiments, uncertainty in the subsurface model is assessed by running multiple inversions with different objective functions which reduce or minimize data misfit as well as minimizing/maximizing the values of any of the low-dimensional parameters or combinations thereof.

Figure 7:
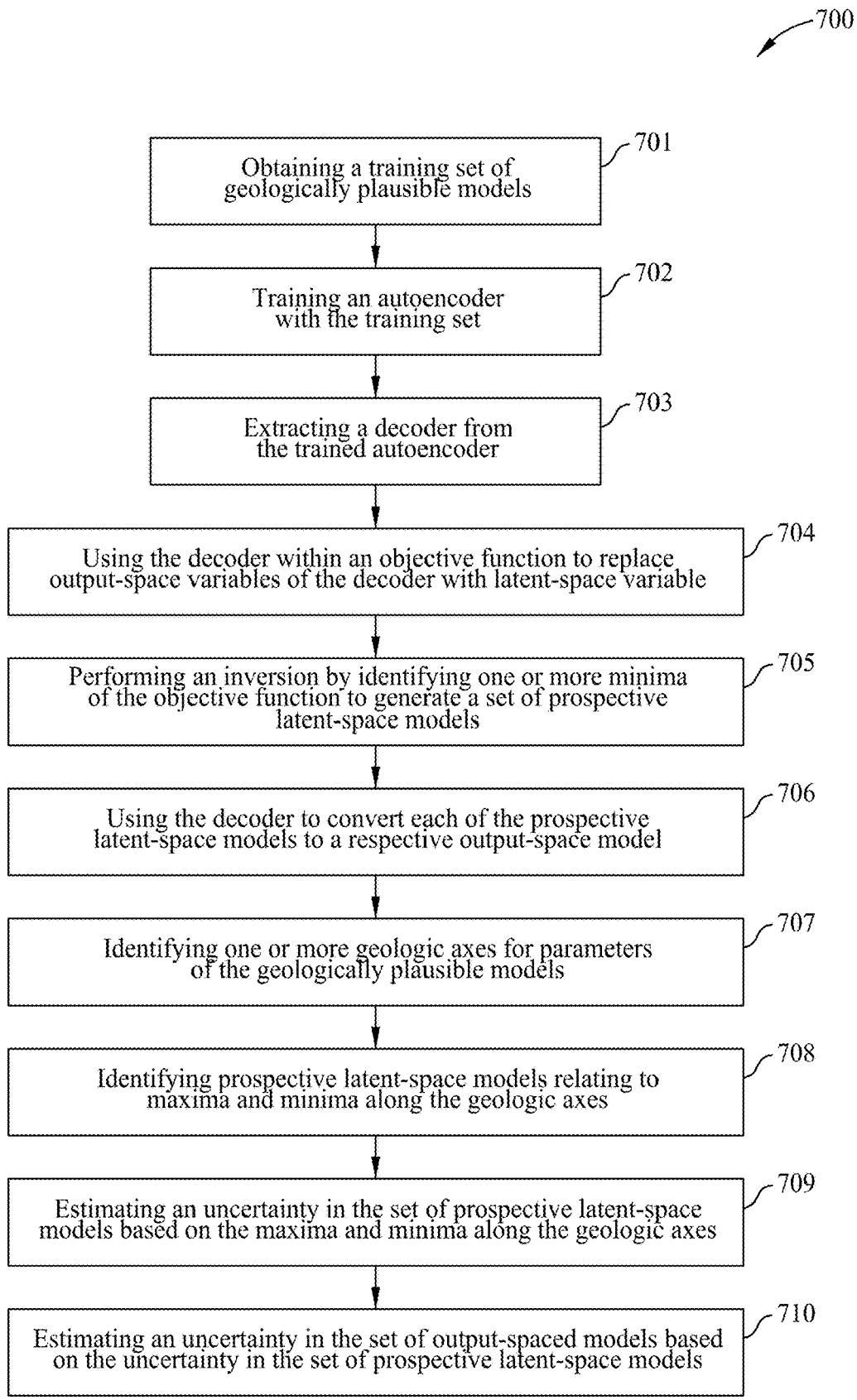
FIG. 7 illustrates another exemplary method disclosed herein.

FIG. 7 illustrates another exemplary method 700. As illustrated, in some embodiments, a model of a subsurface region and uncertainty in that model may be generated. For example, method 700 may begin at block 701 wherein a training set of geologically plausible models for the subsurface region may be obtained. Method 700 may continue at block 702 wherein an autoencoder may be trained with the training set from block 701. Method 700 may continue at block 703 wherein a decoder may be extracted from the trained autoencoder of block 702, wherein the decoder comprises a geologic-model-generating function. Method 700 may continue at block 704 wherein the decoder of block 703 may be used within an objective function to replace output-space variables of the decoder with latent-space variables. In some embodiments, a dimensionality of the output-space variables may be greater than a dimensionality of the latent-space variables.

Method 700 may continue at block 705 wherein an inversion may be performed by identifying one or more minima of the objective function of block 704 to generate a set of prospective latent-space models for the subsurface region. Method 700 may continue at block 706 wherein the decoder of block 703 may be used to convert each of the prospective latent-space models of block 705 to a respective output-space model. Method 700 may continue at block 707 wherein one or more geologic axes may be identified for parameters of the geologically plausible models of block 701. Method 700 may continue at block 708 wherein prospective latent-space models may be identified. In some embodiments, the prospective latent-space models may relate to maxima and minima along the geologic axes of block 707. Method 700 may continue at block 709 wherein an uncertainty in the set of prospective latent-space models of block 705 may be estimated based on the maxima and minima along the geologic axes of block 708. Method 700 may continue at block 710 wherein an uncertainty in the set of output-spaced models of block 706 may be estimated based on the uncertainty in the set of prospective latent-space models of block 709.

In practical applications, the present technological advancement may be used in conjunction with a seismic data analysis system (e.g., a high-speed computer) programmed in accordance with the disclosures herein. Preferably, in order to efficiently perform FWI, the seismic data analysis system is a high performance computer ("HPC"), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 8:
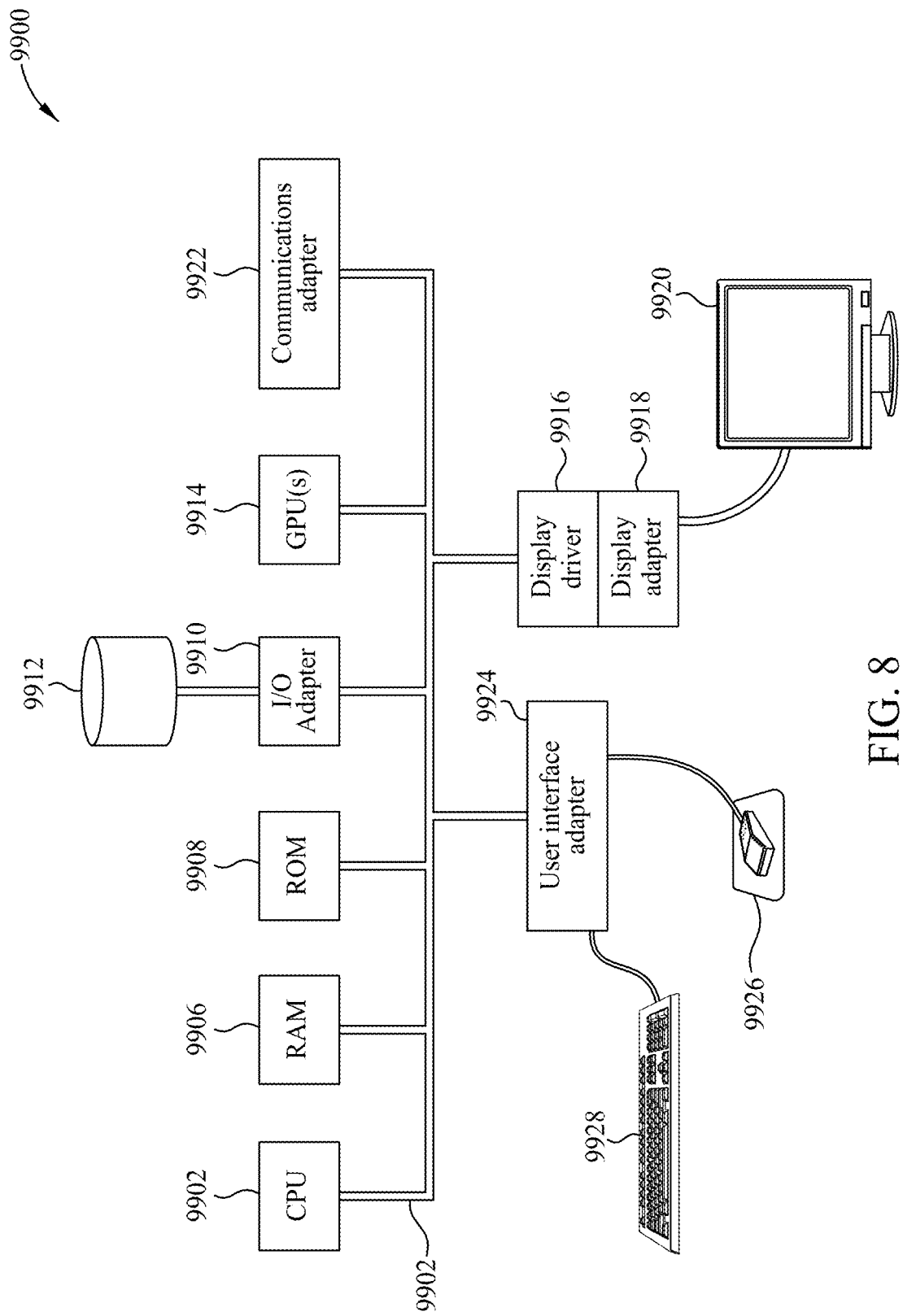
FIG. 8 illustrates a block diagram of a data analysis system upon which the present technological advancement may be embodied.

FIG. 8 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 8, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory ("RAM") 9906, which may be SRAM, DRAM, SDRAM, or the like. The system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display driver(s) 9916.

The I/O adapter 9910 may connect additional non-transitory, computer-readable media such as a storage device(s) 9912, including, for example, a hard drive, a compact disc ("CD") drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein. As the models themselves are representations of geophysical data, such a display device may also be said more generically to be configured to display graphical representations of a geophysical data set, which geophysical data set may include the models described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits ("ASICs") or very large scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures, such as autoencoders and convolutional neural networks. The machine learning architectures may be trained on various training data sets. The machine learning architectures may be applied to analysis and/or problem solving related to various unanalyzed data sets. It should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon models of subsurface regions and/or uncertainty therein constructed according to the above-described methods. In particular, such methods may include drilling a well, and/or causing a well to be drilled, based at least in part upon the models of subsurface regions and/or uncertainty therein (e.g., such that the well is located based at least in part upon a location determined from the models of subsurface regions and/or uncertainty therein, which location may optionally be informed by other inputs, data, and/or analyses, as well) and further prospecting for and/or producing hydrocarbons using the well.

In an embodiments, a method for modeling a subsurface region includes obtaining a training set of geologically plausible models for the subsurface region; training an autoencoder with the training set; extracting a decoder from the trained autoencoder, wherein the decoder comprises a geologic-model-generating function; using the decoder within an objective function to replace output-space variables of the decoder with latent-space variables, wherein a dimensionality of the output-space variables is greater than a dimensionality of the latent-space variables; performing an inversion by identifying one or more minima of the objective function to generate a set of prospective latent-space models for the subsurface region; using the decoder to convert each of the prospective latent-space models to a respective output-space model; identifying one or more geologic axes for parameters of the geologically plausible models; identifying prospective latent-space models relating to maxima and minima along the geologic axes; estimating an uncertainty in the set of prospective latent-space models based on the maxima and minima along the geologic axes; and estimating an uncertainty in the set of output-spaced models based on the uncertainty in the set of prospective latent-space models.

In one or more embodiments disclosed herein, identifying the one or more geologic axes comprises identifying latent parameters, and/or linear combinations thereof, of an encoded space of the autoencoder.

In one or more embodiments disclosed herein, the method also includes identifying a minimum in the objective function that minimizes a combination of data-misfit and deviation from a mean prospective latent-space model; and identifying a best-fit model near a latent-space locus of the identified minimum.

In one or more embodiments disclosed herein, the training set comprises multiple training libraries; and training the autoencoder comprises generating a distinct decoder network for each of the multiple training libraries.

In one or more embodiments disclosed herein, each of the distinct decoder networks is a non-linear, vector-valued function.

In one or more embodiments disclosed herein, the inversion comprises at least one of: Full Wavefield Inversion; seismic tomography; seismic velocity model building; potential fields inversion; and reservoir history matching.

In one or more embodiments disclosed herein, the inversion is based on at least one of:
well-logs; seismic data; time-lapsed seismic data; electromagnetic data, potential-fields data (e.g., gravity); well pressure over time; and well production rates over time by fluid type.

In one or more embodiments disclosed herein, a training set model comprises at least one of: a volumetric description of a porosity and permeability; a volumetric description of a compressional-wave velocity; a volumetric description of a shear-wave velocity; a volumetric description of resistivity; and a volumetric description of density.

In an embodiment, a method for modeling a subsurface region includes obtaining a training set of geologically plausible models for the subsurface region; training an autoencoder with the training set; extracting a decoder from the trained autoencoder, wherein the decoder comprises a geologic-model-generating function; using the decoder within an objective function to replace output-space variables of the decoder with latent-space variables, wherein a dimensionality of the output-space variables is greater than a dimensionality of the latent-space variables; performing an inversion by identifying one or more minima of the objective function to generate a set of prospective latent-space models for the subsurface region; using the decoder to convert each of the prospective latent-space models to a respective output-space model; using dropout layers within the autoencoder to generate an ensemble of decoders; and estimating an uncertainty in the set of output-space models based on the ensemble of decoders.

The term "dropout" generally refers to dropping out the nodes in a neural networks or filters in a convolutional neural networks. For example, a node or filter may be dropped by removing the node from the networks along with all its connections. The choice of which node or filter to drop could be random to generate an ensemble of network models. In some embodiments, predictions from an ensemble after dropout may be used to estimate statistics of subsurface models (e.g. mean and standard deviation).

In some embodiments, the use of dropout layers may create an ensemble of decoders before setting up the objective function. For example, there may be an ensemble of objective functions, one per decoder, given an ensemble of decoders produced by the random dropout technique. Each of these objective functions may result in one or more output space models by finding minima, or by searching for min/max along geologic axes while keeping the level of data misfit fixed or within some reasonable threshold.

In an embodiment, a method for modeling a subsurface region includes obtaining a training set of geologically plausible models for the subsurface region, wherein at least a portion of the training set is generated from a computer simulation; training an autoencoder with the training set; extracting a decoder from the trained autoencoder, wherein the decoder comprises a geologic-model-generating function; using the decoder within an objective function to replace output-space variables of the decoder with latent-space variables, wherein a dimensionality of the output-space variables is greater than a dimensionality of the latent-space variables; performing an inversion by identifying one or more minima of the objective function to generate a set of prospective latent-space models for the subsurface region; and using the decoder to convert each of the prospective latent-space models to a respective output-space model.

In one or more embodiments disclosed herein, the computer simulation comprises at least one of: process stratigraphy; basin and petroleum system modeling; salt body plastic flow simulations; and geomechanical simulations.

In one or more embodiments disclosed herein, the training set comprises multiple training libraries; and training the autoencoder comprises generating a distinct decoder network for each of the multiple training libraries.

In one or more embodiments disclosed herein, each of the distinct decoder networks is a non-linear, vector-valued function.

In one or more embodiments disclosed herein, a training set model comprises at least one of: a volumetric description of a porosity and permeability; a volumetric description of a compressional-wave velocity; a volumetric description of a shear-wave velocity; a volumetric description of resistivity; and a volumetric description of density.

In an embodiment, a method of hydrocarbon management includes obtaining a training set of geologically plausible models for the subsurface region; training an autoencoder with the training set; extracting a decoder from the trained autoencoder, wherein the decoder comprises a geologic-model-generating function; using the decoder within an objective function to replace output-space variables of the decoder with latent-space variables, wherein a dimensionality of the output-space variables is greater than a dimensionality of the latent-space variables; performing an inversion by identifying one or more minima of the objective function to generate a set of prospective latent-space model for the subsurface region; using the decoder to convert each of the prospective latent-space models to a respective output-space model; identifying one or more geologic axes for parameters of the geologically plausible models; identifying prospective latent-space models relating to maxima and minima along the geologic axes; estimating an uncertainty in the set of prospective latent-space models based on the maxima and minima along the geologic axes; estimating an uncertainty in the set of output-spaced models based on the uncertainty in the set of prospective latent-space models; and making one or more hydrocarbon management decisions based on the estimated uncertainty in the set of output-space models.

In an embodiment, a geophysical data analysis system includes a processor; and a display configured to display graphical representations of a geophysical data set, wherein the processor is configured to: obtain a training set of geologically plausible models for the subsurface region, wherein at least a portion of the training set is generated from a computer simulation; train an autoencoder with the training set; extract a decoder from the trained autoencoder, wherein the decoder comprises a geologic-model-generating function; use the decoder within an objective function to replace output-space variables of the decoder with latent-space variables, wherein a dimensionality of the output-space variables is greater than a dimensionality of the latent-space variables; perform an inversion by identifying one or more minima of the objective function to generate a set of prospective latent-space model for the subsurface region; and use the decoder to convert each of the prospective latent-space models to a respective output-space model.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

What is claimed is:

1. A method for modeling a subsurface region, comprising:
   obtaining a training set of geologically plausible models for the subsurface region;
   training an autoencoder with the training set;
   extracting a decoder from the trained autoencoder, wherein the decoder comprises a geologic-model-generating function;
   using the decoder within an objective function to replace output-space variables of the decoder with latent-space variables, wherein a dimensionality of the output-space variables is greater than a dimensionality of the latent-space variables;
   performing an inversion by identifying one or more minima of the objective function to generate a set of prospective latent-space models for the subsurface region;
   using the decoder to convert each of the prospective latent-space models to a respective output-space model;
   identifying one or more geologic axes for parameters of the geologically plausible models;
   identifying prospective latent-space models relating to maxima and minima along the geologic axes;
   estimating an uncertainty in the set of prospective latent-space models based on the maxima and minima along the geologic axes; and
   estimating an uncertainty in the set of output-spaced models based on the uncertainty in the set of prospective latent-space models.

2. The method of claim 1, wherein identifying the one or more geologic axes comprises identifying latent parameters of an encoded space of the autoencoder.

3. The method of claim 1, wherein identifying the one or more geologic axes comprises identifying linear combinations of latent parameters of an encoded space of the autoencoder.

4. The method of claim 1, further comprising:
   identifying a minimum in the objective function that minimizes a combination of data-misfit and deviation from a mean prospective latent-space model; and
   identifying a best-fit model near a latent-space locus of the identified minimum.

5. The method of claim 1, wherein:
   the training set comprises multiple training libraries; and
   training the autoencoder comprises generating a distinct decoder network for each of the multiple training libraries.

6. The method of claim 5, wherein each of the distinct decoder networks is a non-linear, vector-valued function.

7. The method of claim 1, wherein the inversion comprises at least one of:
   Full Wavefield Inversion;
   seismic tomography;
   seismic velocity model building;
   potential fields inversion; and
   reservoir history matching.

8. The method of claim 1, wherein the inversion is based on at least one of:
   well-logs;
   seismic data;
   time-lapsed seismic data;
   electromagnetic data;
   potential-fields data;
   well pressure over time; and
   well production rates over time by fluid type.

9. The method of claim 1, wherein a training set model comprises at least one of:
- a volumetric description of a porosity and permeability;
- a volumetric description of a compressional-wave velocity;
- a volumetric description of a shear-wave velocity;
- a volumetric description of resistivity; and
- a volumetric description of density.

10. A method for modeling a subsurface region, comprising:
- obtaining a training set of geologically plausible models for the subsurface region;
- training an autoencoder with the training set;
- extracting a decoder from the trained autoencoder, wherein the decoder comprises a geologic-model-generating function;
- using the decoder within an objective function to replace output-space variables of the decoder with latent-space variables, wherein a dimensionality of the output-space variables is greater than a dimensionality of the latent-space variables;
- performing an inversion by identifying one or more minima of the objective function to generate a set of prospective latent-space models for the subsurface region;
- using the decoder to convert each of the prospective latent-space models to a respective output-space model;
- using dropout layers within the autoencoder to generate an ensemble of decoders; and
- estimating an uncertainty in the set of output-space models based on the ensemble of decoders.

11. A method for modeling a subsurface region, comprising:
- obtaining a training set of geologically plausible models for the subsurface region;
- training an autoencoder with the training set;
- using dropout layers within the autoencoder to generate an ensemble of decoders;
- extracting the ensemble of decoders from the trained autoencoder, wherein the decoder comprises a geologic-model-generating function;
- for each decoder in the ensemble:
  - using the decoder within an objective function to replace output-space variables of the decoder with latent-space variables, wherein a dimensionality of the output-space variables is greater than a dimensionality of the latent-space variables;
  - performing an inversion by identifying one or more minima of the objective function to generate a set of prospective latent-space models for the subsurface region; and
  - using the decoder to convert each of the prospective latent-space models to a respective output-space model; and
- estimating an uncertainty in the set of output-space models based on the ensemble of decoders.

12. A method for modeling a subsurface region, comprising:
- obtaining a training set of geologically plausible models for the subsurface region, wherein at least a portion of the training set is generated from a computer simulation;
- training an autoencoder with the training set;
- extracting a decoder from the trained autoencoder, wherein the decoder comprises a geologic-model-generating function;
- using the decoder within an objective function to replace output-space variables of the decoder with latent-space variables, wherein a dimensionality of the output-space variables is greater than a dimensionality of the latent-space variables;
- performing an inversion by identifying one or more minima of the objective function to generate a set of prospective latent-space models for the subsurface region; and
- using the decoder to convert each of the prospective latent-space models to a respective output-space model.

13. The method of claim 12, wherein the computer simulation comprises at least one of:
- process stratigraphy;
- basin and petroleum system modeling;
- salt body plastic flow simulations; and
- geomechanical simulations.

14. The method of claim 12, wherein:
- the training set comprises multiple training libraries; and
- training the autoencoder comprises generating a distinct decoder network for each of the multiple training libraries.

15. The method of claim 14, wherein each of the distinct decoder networks is a non-linear, vector-valued function.

16. The method of claim 12, wherein the inversion comprises at least one of:
- Full Wavefield Inversion;
- seismic tomography;
- seismic velocity model building;
- potential fields inversion; and
- reservoir history matching.

17. The method of claim 12, wherein the inversion is based on at least one of:
- well-logs;
- seismic data;
- time-lapsed seismic data;
- electromagnetic data;
- potential fields data;
- well pressure over time; and
- well production rates over time by fluid type.

18. The method of claim 12, wherein a training set model comprises at least one of:
- a volumetric description of a porosity and permeability;
- a volumetric description of a compressional-wave velocity;
- a volumetric description of a shear-wave velocity;
- a volumetric description of resistivity; and
- a volumetric description of density.

19. A method of hydrocarbon management comprising:
- obtaining a training set of geologically plausible models for the subsurface region;
- training an autoencoder with the training set;
- extracting a decoder from the trained autoencoder, wherein the decoder comprises a geologic-model-generating function;
- using the decoder within an objective function to replace output-space variables of the decoder with latent-space variables, wherein a dimensionality of the output-space variables is greater than a dimensionality of the latent-space variables;
- performing an inversion by identifying one or more minima of the objective function to generate a set of prospective latent-space model for the subsurface region;
- using the decoder to convert each of the prospective latent-space models to a respective output-space model;

identifying one or more geologic axes for parameters of the geologically plausible models;
identifying prospective latent-space models relating to maxima and minima along the geologic axes;
estimating an uncertainty in the set of prospective latent-space models based on the maxima and minima along the geologic axes;
estimating an uncertainty in the set of output-spaced models based on the uncertainty in the set of prospective latent-space models; and
making one or more hydrocarbon management decisions based on the estimated uncertainty in the set of output-space models.

20. The method of claim 19, wherein identifying the one or more geologic axes comprises identifying latent parameters of an encoded space of the autoencoder.

21. The method of claim 19, wherein identifying the one or more geologic axes comprises identifying linear combinations of latent parameters of an encoded space of the autoencoder.

22. The method of claim 19, further comprising:
identifying a minimum in the objective function that minimizes a combination of data-misfit and deviation from a mean prospective latent-space model; and
identifying a best-fit model near a latent-space locus of the identified minimum.

23. The method of claim 19, wherein:
the training set comprises multiple training libraries; and
training the autoencoder comprises generating a distinct decoder network for each of the multiple training libraries.

24. The method of claim 23, wherein each of the distinct decoder networks is a non-linear, vector-valued function.

25. The method of claim 19, wherein the inversion comprises at least one of:
Full Wavefield Inversion;
seismic tomography;
seismic velocity model building;
potential fields inversion; and
reservoir history matching.

* * * * *